United States Patent [19]

Vanderhoff et al.

[11] 4,070,323

[45] Jan. 24, 1978

[54] AQUEOUS POLYURETHANE EMULSIONS

[76] Inventors: John W. Vanderhoff, 345 9th Ave., Bethlehem, Pa. 18018; Mohamed S. El-Aasser, 1201 N. Maxwell St., Allentown, Pa. 18103; Joseph D. Hoffman, P.O. Box 567, Logan, Ohio 43138

[21] Appl. No.: 670,907

[22] Filed: Mar. 26, 1976

[51] Int. Cl.² .............................................. C08L 33/14
[52] U.S. Cl. .................. 260/29.6 NR; 260/29.6 R; 260/29.6 MH; 260/29.6 ME; 260/29.6 MQ; 260/29.6 MN; 260/553 B; 260/859 R; 428/423; 526/312; 560/24; 560/157
[58] Field of Search .................. 260/29.6 H, 29.6 R, 260/29.6 H, 29.6 MH, 29.6 ME, 29.6 E, 77.5 MA, 77.5 BB, 29.6 NR, 859 R, 471 C; 526/312; 428/423

[56] References Cited

U.S. PATENT DOCUMENTS

| | | | |
|---|---|---|---|
| 3,509,234 | 4/1970 | Burlant et al. | 260/859 |
| 3,557,249 | 1/1971 | Dannels et al. | 260/858 |
| 3,775,377 | 11/1973 | Kokawa | 260/77.5 CR |
| 3,783,152 | 1/1974 | Larsen | 260/471 C |
| 3,873,640 | 3/1975 | Owston et al. | 260/859 R |

*Primary Examiner*—Harold D. Anderson
*Assistant Examiner*—E. A. Nielsen
*Attorney, Agent, or Firm*—Samson B. Leavitt; Michael A. Leavitt

[57] ABSTRACT

A method comprising
I. reacting isocyanate groups in an organic polyisocyanate by anhydrous reaction with a chemically equivalent amount of primary hydroxyl-containing material, at least about 50 mole % of which material is one or a mixture of
  A. allyl alcohol, or
  B. at least one $C_{2-4}$ hydroxyalkyl ester of acrylic or methacrylic acid, to form a water-resistant adduct of said polyisocyanate with said material, and
II. intimately dispersing said adduct, in the form of a water insoluble liquid phase, into an aqueous liquid medium containing
  a. an anionic or cationic oil-in-water functioning emulsifying agent, in the presence of
  b. an aliphatic hydrocarbon or hydrocarbyl alcohol which is inert, non-volatile, water insoluble, liquid, and contains a terminal aliphatic hydrocarbyl group of at least about 8 carbon atoms; homogenizing the resulting crude emulsion to reduce the average size of the dispersed phase particles to below 0.5 μ; polymerizing the dispersed polyurethane particles in the resulting stable emulsion at suitable temperatures; coating substrates with the emulsions; the adducts, emulsions and coated substrates so produced.

30 Claims, No Drawings

AQUEOUS POLYURETHANE EMULSIONS

This invention relates to the production of stable polyurethane emulsions, particularly such emulsions containing relatively small dispersed polyurethane particles averaging below about 0.5 $\mu$ and curable or hardenable at ambient temperatures.

In general, aqueous polymer emulsions may be prepared by emulsion polymerization (of a monomer) or by emulsification (of a pre-formed polymer). The polymer emulsions prepared by emulsion polymerization contain adequately small size polymer particles averaging about 0.1 to 0.3 $\mu$ but the precursor monomers are limited to those polymerizable in an aqueous medium in the presence of free-radical initiators or the like. Polymer emulsions from monomers not so polymerizable are prepared by emulsifying the previously polymerized monomers by any one of three general types of emulsification procedures, namely:

1. direct emulsification of an organic solvent solution of the polymer in water using an oil-in-water type emulsifier to form droplets or particles of the polymer solution dispersed in water, after which the solvent may then be removed as by stripping or other method of removal. This method generally yields average polymer droplet sizes in the emulsion of about 1 $\mu$ larger.

2. inversion emulsification of the polymer solution by adding water thereto in the presence of an oil-in-water emulsifier which can function at least partially effectively as a water-in-oil emulsifier so that an emulsion of water-in-polymer solution is initially formed which, upon further addition of water, inverts to form a polymer solution-in-water emulsion. This method, however, generally calls for greater care and control than method (1) and in addition yields average polymer droplet sizes in the emulsion of about 0.8 - 1.0 $\mu$ or larger.

3. emulsification by neutralization in which the polymer is prepared with functional acidic or basic groups and is emulsified in water by neutralizing these groups. Although this method can yield average polymer droplet sizes as small as 0.1 $\mu$, films cast from such emulsions are usually water-sensitive due to the significant proportions of functional acidic or basic groups in the polymer.

It is accordingly generally preferable to employ the above direct emulsification method (1). The five-fold difference in particle size between latexes prepared by this method (minimum 1 $\mu$) and latexes prepared by emulsion polymerization (0.2 $\mu$) is however critical with respect to stability or resistance to settling or sedimentation. According to the Stroke's law, for spherical particles, rate of sedimentation = $(D^2/18\ \eta)\ (d_p - d_m)g$ where $D$ is the particle diameter, $\eta$ the viscosity of the medium, $d_p$ and $d_m$ the densities of the particles and the medium, respectively, and $g$ the gravitational constant.

The tendency for colloidal particles to settle upon standing is offset by their Brownian motion and the convection currents arising from small temperature gradients in the sample. The Brownian motion, which results from the unbalanced collisions of solvent molecules with the colloidal particles, increases in intensity with decreasing particle size. The convection currents depend upon the sample size and storage conditions. One criterion for settling is that a sedimentation rate of 1 mm. in 24 hours will be offset or nullified by the thermal convection currents and Brownian motion within the sample (Overbeek, in "Colloid Science, Vol. I", H. R. Kruyt, editor, Elsevier, Amsterdam, 1952, p. 80). Substituting this sedimentation rate in the above Stroke's equation enables determination of the largest particle size which, in any particular instance, will not settle out upon standing.

Thus, for polystyrene (density $d_p = 1.05$ gm/cm$^3$) dispersed in water (density $d_m = 1.00$, viscosity $n = 1$ cp), the largest particle size which will not settle on standing is 0.65 $\mu$. This calculated critical particle size is consistent with experimental obsevations that 1.0 $\mu$ diameter monodisperse polystyrene latex particles settle out on standing within 1–3 months, 0.8 $\mu$ diameter particles settle out within 3–6 months, and particles of 0.5 $\mu$ or smaller never settle out at all. As a matter of fact, 1 $\mu$ diameter particles of most polymers, the minimum size generally produced by the direct emulsification method, settle at a relatively rapid rate which can be reduced by raising the viscosity of the waterphase in some manner.

Polyurethanes are generally prepared by reaction of an organic polyisocyanate with an organic polymer containing isocyanate-reactive hydroxyl groups. Such groups may for example be present in polyesters, polyethers and/or polyesteramides. The organic polyisocyanate may be aromatic, but preferably aliphatic for film-forming coating purposes, as for example polymethylene diisocyanates such as ethylene diisocyanate and hexamethylene diisocyanate, and other alkylene diisocyanates such as propylene-1,2-diisocyanate. The polyisocyanate, which may itself be a prepolymer containing recurring and/or terminal isocyanate groups, is generally prereacted in molar excess with the polyhydroxyl-containing reactant to yield a liquid prepolymer containing residual isocyanate groups. The prepolymer is subsequently cured, generally by means of a cross linking agent, e.g. a substance containing at least two active hydrogen atoms per molecule, such as diols or diamines such as 4,4'-methylenebis-(2-chloroanilene) (MOCA), or even water.

The presence of any significant amount of water in the above reactions prior to the curing step must however be avoided since water reacts with available isocyanate groups to liberate carbon dioxide. For example, a presently employed system for applying a polyurethane coating to a substrate such as an epoxy primer layer on aluminum or the like involves mixing an organic solvent solution of an aliphatic polyisocyanate prepolymer with an organic solvent solution containing a hydroxyl-terminated polyester, pigments, and a small amount of dibutyl tin dilaurate, and coating the mixture onto the substrate. Upon evaporation of the solvent, the isocyanate groups of the prepolymer contact and react with the hydroxyl groups of the polyester to form a cross-linked polymer film. The prepolymer is employed in slight molar excess whereby the unreacted isocyanate groups remaining in the crosslinked film are available for further reaction with moisture in the air to produce further cross-linking.

The above-described organic solvent coating system however poses obvious hazards to life and property by reason of flammability, toxicity, pollution and the like, which could be avoided for example by mixing solvent-free aqueous emulsions of the polyisocyanate and polyhydroxy reactants and applying the mixture to the substrate. The problem however is not so simply solved since upon emulsification of the isocyanate-containing prepolymer in water, the isocyanate groups would react vigorously and rapidly with the water with release of carbon dioxide and foam.

The problem could under other circumstances be possibly solved by reacting the isocyanate groups in the polyisocyanate reactant with a protective blocking compound of known type, e.g. phenols, naphthols, oximes, imides, diphenyl amine, phenyl methyl pyrazolone, caprolactam, malonic acid esters, acetoacetic ester and acetylacetone; O. Bayer, Angew. Chemie A59, p. et seq. (1947), and U.S. Pat. Nos. 2,725,385 and 2,733,261. The resulting blocked isocyanate-containing reactant could then be mixed in the presence of water with the polyhydroxy reactant, and subsequently unblocked for reaction at any desired time. Such unblocking or splitting to release the free reactive isocyanate groups requires however heating to temperatures of 90° to 100° C. and above, which is obviously impossible or impractical in the above-described and similar systems involving application, drying and hardening of the coating under ambient conditions, e.g. room temperature and pressure, in normal use by the consumer, contractor, etc. without baking or other heating facilities.

It is an object of this invention to provide a direct polyurethane emulsification process which will not be subject to one or more of the above disadvantages.

Another object of this invention is the provision of such a process effective for producing solvent-free aqueous emulsions of polyurethane particles averaging less than about 0.5 $\mu$, and generally about 0.1 to about 0.3 $\mu$, in size (diameter).

Still another object of this invention is the provision of such a process effective for producing aqueous polyurethane emulsions which provide protective coatings on substrates under ambient conditions.

A further object of the invention is the provision of such a process conducted in the substantial absence of an inert volatile organic solvent and/or polyurethane emulsions with improved stability or resistance to sedimentation.

A still further object of the invention is the provision of a novel water-resistant adduct of an organic polyisocyanate.

Yet a further object of the invention is the provision of such an adduct which is polymerizable in the presence of water.

Other objects and advantages will appear as the description proceeds.

The attainment of one or more of the above objects is made possible by this invention which includes a method comprising I. reacting isocyanate groups in an organic polyisocyanate by anhydrous reaction with a chemically equivalent amount of primary hydroxyl-containing material, at least about 50 mole % of which material is one or a mixture of
  A. allyl alcohol, or
  B. at least one $C_{2-4}$ hydroxyalkyl ester of acrylic or methacrylic acid, to form a water-resistant adduct of said polyisocyanate with said material, and II. intimately dispersing said adduct, in the form of a water insoluble liquid phase, into an aqueous liquid medium containing
  a. an anionic or cationic oil-in-water functioning emulsifying agent, in the presence of
  b. an aliphatic hydrocarbon or hydrocarbyl alcohol which is inert, non-volatile, water insoluble, liquid, and contains a terminal aliphatic hydrocarbyl group of at least about 8 carbon atoms.

The invention further includes subjecting the crude emulsion from the foregoing process to the action of comminuting forces sufficient to reduce the average particle size of the dispersed water-insoluble polyurethane-containing liquid phase to less than about 0.5 $\mu$.

The invention still further includes either gradually adding the stable emulsion from the aforesaid comminuting step to an aqueous medium containing a free radical initiator to substantially fully polymerize the polyurethane in the emulsion, or adding an air-curing catalyst to said stable emulsion.

The invention also includes coating a substrate with a film of the resulting fully polymerized emulsion or air-curing emulsion and permitting the film to harden in situ on the substrate.

The invention additionally includes the adducts, emulsions and coated substrates produced in the above procedures.

It has previously been recognized that the addition of long chain fatty alcohols increases the capacity of anionic emulsifiers to disperse and stabilize oil-in-water emulsions; J. W. Shulman and E. G. Cockbain, Trans. Faraday Soc., 36, 651 (1940). For example, British Patents 607,704 and 627,612 disclose mixing cetyl or stearyl alcohol or the like with acrylic ester, methacrylic ester, or vinyl carboxylic acid ester monomer and emulsifying the mixture in an aqueous medium containing an anionic emulsifier to produce an emulsion suitable for polymerization. An article in Pure Appl. Chem. 25 121 (1971) describes the use of anionic emulsifier-fatty alcohol combinations in the emulsion polymerization of vinyl chloride monomer. And our article "Emulsion Polymerization: Initiation of Polymerization in Monomer Droplets," Polymer Letters 11, 503 (1973) discloses that anionic emulsions of styrene monomer in water with droplet sizes as small as 0.2 $\mu$ can be prepared using a sodium lauryl sulfate-cetyl alcohol mixed emulsifier combination. However, none of these publications deal with the direct emulsification of previously formed polymers to yield stable, very fine particle size polymer emulsions or the problems peculiar thereto. Nor of course do they deal with polyurethanes or their water-reactive polyisocyanate precursors.

According to one broad aspect of the invention, a water resistant (inert to water) adduct which is further polymerizable in the presence of water is prepared by reacting the organic polyisocyanate with a polymerizable vinyl or ethylenically unsaturated monomer containing an isocyanate-reactive (primary) hydroxyl group to introduce vinyl functionality at isocyanate sites of the polyisocyanate. Desirably a minor proportion of a $C_{1-6}$ monohydric primary alkanol, relative to said monomer, is introduced therewith to moderate the reaction, control cross-linking functionality and/or flexibility, etc., by reacting with and introducing non-reactive hydrocarbon groups at the remaining isocyanate sites. The reaction is preferably carried out in a reactive diluent solution, e.g. an ethylenically unsaturated monomeric polymerizable liquid devoid of isocyanate-reactive hydroxyl groups to control viscosity, avoid use of an inert volatile organic solvent requiring subsequent removal, control polymer properties, etc. The resulting adduct solution is then emulsified in water in the presence of an anionic or cationic emulsifying agent and the above-described higher aliphatic hydrocarbon or hydrocarbyl alcohol, the resulting crude emulsion treated in a homogenizer or the like to yield a stable emulsion containing particles of the polyurethane-reactive diluent having an average size less than about 0.5 $\mu$, usually from about 0.3 $\mu$ to 0.1 $\mu$ or less, and the resulting stable emulsion added gradually to an aqueous medium containing free-radical initiator as polymerization of the vinyl group-containing polyurethane-reactive diluent particles proceeds to completion at preferably elevated temperatures of about 40° to 70° C, such as 60° C. The resulting stable latex contains particles of fully polymerized polyurethane composition having interpenetrating polymer networks, one of said adduct, and the other of the copolymer of the hydroxy-containing vinyl monomer, e.g. the hydroxyalkyl acrylate or methacrylate, with the reactive diluent.

Alternatively, an air-curing/drying emulsion can be prepared by adding to the stable emulsion from the comminuting step a catalytic amount of cobalt naphthenate and 0 to about 2%, preferably about 0.5 to 1.5%, of methyl ethyl ketone peroxide by weight of the water insoluble dispersed phase.

Any of the above-mentioned organic polyisocyanates may be employed in the present invention, the aliphatics being preferred. Several such materials are commercially available. Preferred types are the aliphatic biuret polyisocyanates, of molecular weight ranging from about 400 to 2500, such as the biuret of 1,6-hexamethylene diisocyanate, which are described in U.S. Pat. No. 3,124,605, which description is incorporated herein. A commercially available biuret of the latter type is available as Desmodur N-100 (Mobay Chem. Co.).

The $C_{2-4}$ hydroxyalkyl acrylates and methacrylates operative herein include the hydroxyethyl, hydroxybutyl, hydroxyisobutyl and, preferably for its optimum solubility and film forming properties, hydroxypropyl methacrylates and acrylates, and mixtures thereof. Although they may be reacted in stoichiometric or chemically equivalent proportions based on the isocyanate groups, it is preferred to replace up to 50 mole %, e.g. about 20 to 50 mole %, of such hydroxyalkyl acrylate or methacrylate reactant by a non-vinyl blocking reactant such as a $C_{1-6}$ primary monohydric alcohol, for example methanol, ethanol, propanol, 1-hexanol, or preferably 1-butanol, or mixtures thereof.

Similar considerations apply with respect to the allyl alcohol reactant, which however is preferably reacted in chemically equivalent proportions based on the polyisocyanate, in the absence of a non-vinyl blocking reactant.

The reaction to form the water resistant adduct of the polyisocyanate is carried out at ambient temperatures in the presence of a catalytic amount, e.g. about 0.1 to 2%, preferably about 0.2 to 0.5%, of dibutyl tin dilaurate by weight of the polyisocyanate. Completion of this reaction may require from about 24 up to 48 or more hours.

Sufficient reactive diluent is present in the reaction medium to yield a flowable, readily emulsifiable liquid, e.g. having a viscosity less than about 10,000 cps. The reactive diluent should be substantially water insoluble and employed in as low proportions as possible since, for maximum efficiency and economy, the polymer (solids) components concentration therein should be as high as possible, for example from as low as about 10% to as high as about 90%, more usually about 30 to 70% by weight.

The reactive diluent is a non-isocyanate-reactive, ethylenically unsaturated polymerizable liquid monomer, preferably a $C_{1-4}$ alkyl acrylate or methacrylate or mixtures thereof such as the methyl, ethyl, propyl, isopropyl and, preferably, butyl and isobutyl acrylates and methacrylates. Other suitable reactive diluents may be employed such as dimethyl and diethyl fumarate and maleate, acrylonitrile, and the like. However, when employing allyl alcohol as the adduct-reactant, the use of such reactive diluent in the adduct-forming reaction medium is unnecessary, being instead added subsequently, but of course prior to the emulsification step, desirably together with an unsaturated polyester prepolymer in proportions of about 0.5–1.5:1 by weight of the previously formed adduct, whereafter the resulting mixture is preferably but not necessarily held at ambient temperature for another 24 to 48 hours prior to emulsification. This unsaturated polyester improves the flexibility of the final cured and dried films.

The oil-in-water functioning emulsifying agents employed in the process of this invention are well known in the art, being generally surface active agents also useful in the detergent field. Any of these known anionic and cationic surface active detergents or emulsifying agents, and mixtures thereof, are operative, being for example fully described in U.S. Pat. No. 3,762,859 at column 3, line 6 to column 5, line 6 and column 7, line 54 to column 8, line 15, which description is incorporated herein by reference thereto. Those preferred as the anionics are the sodium $C_{10-20}$ alkyl sulfates such as sodium lauryl or hexadecyl sulfate, and as the cationics, the quaternary ammonium halides such as hexadecyl trimethyl ammonium bromide or octadecyl pyridine bromide.

The emulsifying agent is operative in the aqueous medium in relatively low concentrations, being generally included therein in proportions of about 0.1 to about 5%, preferably about 0.2 to about 3%, by weight of the water in the aqueous phase.

The higher aliphatic hydrocarbyl-containing additive compound, or mixture thereof, required in carrying out the process of this invention is generally employed in proportions of about 0.2% to about 12%, preferably about 0.4% to about 6%, by weight of the adduct-containing phase. The terminal aliphatic hydrocarbyl group of at least about 8 carbon atoms contained therein may be unsaturated but preferably saturated, and branched but preferably straight chain. These additives should be relatively highly water-insoluble e.g. to the extent of less than about $10^{-3}$ grams, preferably less than about $10^{-4}$ grams, per liter of water in the aqueous phase. They should not have too high a molecular weight, e.g. not more than about 5,000, preferably not more than about 2,000, and still more preferably from about 110 to about 500.

As only illustrative of the types of such additive compounds operative herein, there may be mentioned: aliphatic hydrocarbons such as n-octane, n-decane, 1-decene, 1-dodecene, n-tetradecane, n-hexadecane, n-octadecane, eicosane, tetracosane, 2-hexadecyne, 2-tetradecyne, 1-tetradecene, 2,3,4,4,6,8,8-heptamethyl nonane ($C_{16}H_{34}$), 2,6,10,14-tetramethyl pentadecane (Pristan, $C_{19}H_{40}$), and 2,6,10,15,19,23-hexamethyl tetracosane (Squalan, $C_{30}H_{62}$), and hydrocarbyl alcohols such as tetradecanol, cetyl alcohol (hexadecanol), eicosanol, 1-heptadecanol and ceryl alcohol (1-hexaeicosanol). The aliphatic hydrocarbons, especially the $C_{10-20}$ n-alkanes, are preferred as yielding in most instances somewhat better emulsification results, and as generally having lower melting points than the corresponding hydrocarbyl alcohols, of which the $C_{14-20}$ n-alkanols are preferred. Such lower melting points in many instances permits carrying out the emulsification step at ambient temperatures.

The above described additive compounds may be included in either the aqueous medium phase or in the adduct phase prior to their admixture. For example, the aliphatic hydrocarbons are generally included in the adduct phase, and the hydrocarbyl alcohols in the aqueous phase. The type of adduct phase, temperature, etc. are often factors to be considered in making the choice between inclusion in one phase or the other. Further, as a rule of thumb, when the additive is included in the aqueous phase, its weight ratio relative to the emulsifying agent is generally more than 1:1, especially up to about 2:1. When included in the adduct phase, the ratio is about 0.3:1 to 1:1.

These additive compounds increase the stability of these fine-sized particle emulsions by inhibiting sedimentation or degradation caused by the tendency of the small particles or droplets to coalesce or diffuse molecularly. They should hence be inert, and resistant to diffusion into the aqueous medium phase and to any substantial heating procedures applied after the comminuting step. This calls for the above-described properties of water insolubility, and non-volatility. They generally have boiling points above about 150° C. They must also be liquid under the emulsification conditions of the present process, i.e. melting points below and boiling points above, or soluble in a solvent at, such emulsification temperatures.

In carrying out the process of this invention, the described liquified adduct phase is admixed with stirring or other agitation (e.g. "Lightning Mixer") into the described aqueous medium phase containing the emulsifying agent, at any temperatures ranging from room temperatures to below the boiling point of the aqueous medium (at the pressure employed-normal, sub- or super-atmospheric), often ranging from about 40° to about 90° C, preferably about 55° to about 75° C. Such temperatures should be above the melting point of the higher aliphatic hydrocarbyl additive.

As indicated above, it is desirable to produce emulsions with as high a solids content as possible and accordingly the ratio of the liquified adduct phase to the aqueous medium phase should be as high as possible without of course introducing inversion possibilities, i.e. emulsification of the aqueous phase in the adduct phase. The weight ratio of the adduct phase to the aqueous phase generally will range from about 0.1:1 to about 2:1, more preferably about 0.2:1 to 1:1, most preferably about 0.2:1 to 0.4:1.

The resulting crude emulsion of coarse adduct phase droplets is then subjected, at temperatures, preferably elevated, similar to those referred to about as useful in the emulsification step, to the action of comminuting forces sufficient to enable the production of an aqueous emulsion containing adduct phase particles averaging less than about 0.5 $\mu$, desirably less than about 0.3 $\mu$ to about 0.1 $\mu$ or lower. Means for applying such comminuting forces are well known in the art and are a matter of judicious selection in carrying out the present process. Such forces may be of any type, e.g. shear, attrition, impact, explosion, implosion, or any combination thereof. A number of types of devices for subjecting the crude emulsion to such comminuting forces are commercially available, including homogenizers, submicron dispersers, colloid mills, ultrasonic vibrators, and the like.

One such commercially available device is the Manton-Gaulin Model 15M-8TA Laboratory Homogenizer and Submicron Disperser (Manton-Gaulin Co.). The crude emulsion is forced through a small orifice at pressures up to 8,000 psi; the rapid increase in velocity between the valve stem and seat causes cavitation of the liquid and the formation of bubbles; the collapse of these bubbles sets the valve stem into vibration at high frequencies (20–50 kilocycles/sec.), which breaks the emulsion droplets to a smaller size. The homogenized emulsion can be recycled through the orifice by use of a 3-way valve in the device to direct it back to the supply tank.

Another such commercially available device is the Model W-350 Sonifier Cell Disruptor (Heat System-Ultrasonics, Inc.) which converts a 110-volt AC line voltage to electrical energy with a frequency above the audible range (20 kilohertz). A sonic converter transforms this energy into mechanical energy at the same frequency, which in turn is transmitted through an 0.75 inch horn tip into the liquid being treated. The ultrasonic waves cause cavitation in the liquid, producing a tearing action at any phase boundaries in the system.

The above-described crude emulsion is passed or recycled through such comminuting device or devices a sufficient number of times usually two, three or more times, until a stable emulsion is obtained containing the desired small size adduct phase particles.

The resulting stable emulsion of finely divided, mostly submicroscopic adduct phase particles or droplets, according to one embodiment, is subjected to addition polymerization conditions, e.g. in the presence of a free radical initiator, to substantially fully polymerize the polymeric components in the dispersed phase. It has been found however that to obtain the desired stable fluid latex, instead of a coagulated mass, the emulsion must be added gradually, e.g. approximating the rate of polymerization of the incremental additions, to an aqueous medium containing the free radical initiator, preferably potassium persulfate, employed in an amount ranging from about 0.2 to 2%, preferably about 0.5 to 1.5%, e.g. 1%, by weight of the polymerizable components, i.e. the dispersed phase. The initiator is also preferably added gradually or incrementally to the polymerization medium, which is preferably at an elevated temperature such as about 50° to 80° C., buffered to approximate pH 7, as with sodium bicarbonate, and contains emulsified hydrocarbyl additive as employed in the previous emulsification of the adduct.

The resulting fully polymerized stable emulsion or latex contains polyurethane particles ranging from about 0.03 to 0.4 $\mu$ in size, and can be coated and permitted to dry and harden on any desired substrate such as epoxy primer layer, aluminum, other metal and plastic surfaces, etc., to yield flexible protective films. The water could also be removed from the latex and the remaining polymerized polyurethane employed in powder form in adhesives, paints, etc.

The above described fully polymerized emulsions are preferably those derived from adducts of the polyisocyanate with the hydroxyalkyl acrylates and methacrylates. According to another embodiment, the stable emulsion from the comminuting step is made the basis of an air-drying/curing composition by addition thereto of a catalytic amount of cobalt naphthenate corresponding to about 0.02 to 0.2%, preferably about 0.01 to 0.1%, optimally about 0.05%, of cobalt based on the weight of the dispersed organic phase. The resulting latex, preferably containing the allyl alcohol-based adduct, can be applied to any desired substrate and air-cured/dried/-hardened thereon for protective purposes.

According to a further improvement, up to about 2%, preferably about 0.5 to 1.5%, of methyl ethyl ketone peroxide based on the weight of the dispersed organic phase is also included with the above-described cobalt naphthenate to obtain an air-curing/drying latex with greater versatility, faster curing rate, etc. The peroxide-cobalt naphthenate catalyst combination is effective with any of the adducts of this invention, i.e. derived from allyl alcohol, hydroxyalkyl acrylates and methacrylates, and mixtures thereof.

The following examples are only illustrative of preferred embodiments of this invention and are not to be regarded as limitative. Deionized water is employed therein. The organic polyisocyanate (OPI) is an isocyanate-containing or-capped prepolymer in the form of a clear, pale yellow, viscous liquid, relatively high molecular weight (about 1,000) biuret of 1,6-hexamethylene diisocyanate containing little residual 1,6-hexamethylene diisocyanate (e.g. less than about 0.7%). All amounts and proportions referred to herein and in the appended claims are by weight unless otherwise indicated.

EXAMPLE 1

I. 10.0 gm. of organic polyisocyanate prepolymer (OPI) and stoichiometric proportions of the reactants, namely 4.2 gm. of hydroxypropyl methacrylate and 1.6 gm. of 1-butanol, are added with stirring to a Pyrex glass beaker containing as reactive diluents 9.0 gm. of n-butyl acrylate and 12.5 gm. of isobutyl methacrylate, and 0.025 gm. of dibutyl tin dilaurate catalyst. The adduct-forming reaction between the isocyanate groups in the OPI and the hydroxyl groups in the said reactants is allowed to proceed to completion while standing at room temperature for 48 hours.

II. An aqueous emulsifying medium is prepared by dissolving 0.40 gm. of sodium lauryl sulfate and 0.80 gm. of cetyl alcohol in 75 gm. of water at about 63° C. in a 250 ml. Erlenmeyer flask with stirring for 30 minutes, 25 gm. of the adduct-containing medium from paragraph I are mixed with stirring into the aqueous emulsifying medium at about 63° C., and the stirring continued for 30 minutes to produce a crude emulsion.

III. The crude emulsion is then subjected to homogenization by passage twice through the Manton-Gaulin Submicron Disperser operating at 6,000 psi. to yield a stabilized emulsion containing dispersed adduct-containing droplets ranging in size from about 0.03 to 0.4 $\mu$. Similar results are obtained when the homogenization is carried out by ultrasonic irradiation, e.g. by placing the Sonifier Disruptor Horn in the hot crude emulsion and adjusting the power output meter to about 300 watts for 2 minutes. A combination of both homogenizing procedures is also effective.

IV. A polymerization medium is prepared by adding 0.80 gm. of sodium lauryl sulfate, 0.40 gm. of cetyl alcohol, and 0.25 gm. of sodium bicarbonate to 200 gm. of water in a 1 liter, 4 neck glass flask equipped with Teflon paddle stirrer, condenser, addition funnel, and nitrogen inlet, and stirring the mixture at 300 rpm. for 30 minutes at about 63° C. while sparging with oxygen-free nitrogen. Then 0.25 gm. of potassium persulfate initiator is added through the nitrogen inlet and stirring continued at 60 rpm. for 10 minutes, at which point gradual addition thereto of the stabilized emulsion (about 100 gm.) from III above is started and completed over a period of 3–4 hours. The stirring rate is then reduced to 40 rpm. and the polymerization continued for another 4 hours to completion at the same temperature under a nitrogen atmosphere. A stable latex containing fully polymerized polyurethane in the dispersed phase is obtained.

V. The latex from IV when applied on a substrate such as epoxy film prime coat, aluminum, or other plastic, metal or the like and permitted to dry and harden forms a tough somewhat hazy protective film of high gloss.

In the examples in Table I below, the procedure of Example 1 above is followed, the amounts employed (in grams) being normalized for the use of 8.1 instead of 10.0 gm. of the OPI prepolymer. In the table, HEMA is hydroxymethyl methacrylate, HPMA is hydroxypropyl methacrylate, Alco. is alcohol, MeOH is methanol, EtOH is ethanol, PrOH is 1-propanol, BuOH is 1-butanol, HexOH is 1-hexanol, nBA is n-butyl acrylate, iBMA is isobutyl methacrylate, MMA is methyl methacrylate, and VCN is acrylonitrile.

TABLE I

| | Adduct | | | Reactive Diluent | | | |
|---|---|---|---|---|---|---|---|
| Ex. | HEMA | HPMA | Alco | nBA | iBMA | MMA | VCN |
| 2 | 5.0 | | | 18.0 | | | |
| 3 | 3.0 | | 1.3 BuOH | 8.0 | 8.0 | | |
| 4 | 5.0 | | | 16.0 | | | 2.0 |
| 5 | 5.0 | | 1.3 | 14.0 | | | 2.0 |
| 6 | 3.0 | | 1.3 BuOH | 16.0 | | | 2.0 |
| 7 | 3.0 | | 1.3 BuOH | 14.0 | | | 4.0 |
| 8 | 3.0 | | 1.3 BuOH | 10.0 | | 6.0 | |
| 9 | 5.0 | | 1.3 BuOH | 8.0 | | 4.0 | 4.0 |
| 10 | 3.0 | | 1.3 BuOH | 8.0 | | 4.0 | 4.0 |
| 11 | 3.2 | | 1.3 BuOH | 12.0 | | | 4.0 |
| 12 | | 3.4 | 1.3 BuOH | 8.0 | 8.0 | | |
| 13 | | 3.4 | 1.3 BuOH | 7.3 | 10.1 | | |
| 14 | | 3.4 | 1.6 BuOH | 7.3 | 7.3 | | |
| 15 | 3.4 | | 0.6 MeOH | 10.9 | 5.8 | | |

TABLE I-continued

| Ex. | Adduct | | | Reactive Diluent | | | |
|---|---|---|---|---|---|---|---|
| | HEMA | HPMA | Alco | nBA | iBMA | MMA | VCN |
| 16 | 3.3 | | MeOH 0.6 | 7.3 | 7.3 | | |
| 17 | | 3.4 | EtOH 1.8 | 7.3 | 7.3 | | |
| 18 | | 3.3 | HexOH 1.3 | 7.3 | 7.3 | | |
| 19 | | 2.8 | PrOH 1.4 | 6.8 | 6.8 | | |
| 20 | | 3.3 | BuOH 2.4 | 7.3 | 7.3 | | |
| 21 | | 2.3 | BuOH 1.3 | 7.3 | 7.3 | | |
| 22 | | 3.4 | BuOH | 7.3 | 8.9 | | 1.6 |

More or less acceptable films are produced in the above examples, none being better than those employing the HPMA/BuOH adduct combination and the nBA/iBMA reactive diluent combination.

EXAMPLE 23

I. The procedure of step I, Example 1, is repeated using 8.1 gm. of OPI prepolymer, 2.2 gm. (stroichiometric amount) of allyl alcohol as reactant, 0.25 ml. toluene solution containing 0.02 gm. dibutyl tin dilaurate, and no reactive diluent. The mixture becomes hot on stirring, indicating a faster reaction than in the Example 1 system which only becomes warm. After standing from 48 hours at ambient conditions, the adduct is mixed with 9.0 gm. of n-butyl acrylate reactive diluent and 12.0 gm. Paraplex P-444A (unsaturated polyester-containing prepolymer of Rohm & Haas Company) which, if added before the allyl alcohol reaction, would react with the isocyanate groups in the OPI with release of carbon dioxide. The mixture is allowed to stand at room temperature for another 48 hours.

II. The above adduct-containing medium is then emulsified by the procedure of Example 1, step II, with proportional adjustments where needed, to produce a crude emulsion.

III. The crude emulsion from II is subjected to the procedure of Example 1, step III, to produce a stabilized emulsion of dispersed adduct-containing droplets.

IV. An air-drying emulsion is produced by mixing 0.05% of cobalt naphthenate catalyst into the stabilized emulsion from III.

V. The latex from IV when applied to any substrate forms a soft, tacky continuous film which dries within 48 hours at room temperature to a hard, somewhat brittle, glossy protective film.

The Paraplex P-444A employed above and in some of the following examples (P-444A) is a liquid containing 75% of unsaturated polyester prepolymer derived from glycol and anhydride reactants, e.g. polymethylene glycol and maleic anhydride, with an acid number of 38, specific gravity 1.183 at 25° C. and viscosity of 3500 cps. in admixture with 25% of methyl methacrylate. The Multron R-16 (Mobay Chemical Co.) employed in some of the following examples (R-16) is a liquid hydroxyl terminated (diol) polyester prepolymer, molecular weight 2600. These prepolymers are not critical to the invention, being added to provide improved properties, e.g. flexibility, to the ultimate films from the final emulsions. They could be eliminated or replaced with other similar prepolymers. In the examples in Table II below, some of the components other than the above prepolymers correspond to those referred to in similar manner in Table I above. As additional components, AA is allyl alcohol and DEF is diethyl fumarate. The procedure followed in carrying out the examples in Table II generally corresponds to those of Examples 1 and 23 above; the adducts are prepared by mixing the listed ingredients with 16.2 gm. of OPI prepolymer and 0.50 ml. toluene solution containing 0.04 gm. of dibutyl tin dilaurate and allowing the mixture to stand for 48 hours at room temperature; the reactive diluents and P-444A are added after the adduct has polymerized for 24 hours; steps II and III of Examples 1 and 23, with suitable proportional adjustments where called for, are employed for emulsification and comminution; 0.05% cobalt (as a 6% cobalt naphthenate emulsion), and 1% methyl ethyl ketone peroxide, based on the dispersed adduct-containing organic phase, are stirred into the stabilized emulsion from the comminuting step III; the resulting emulsions are coated on aluminum yielding soft tacky films which are dried within 16 hours to form tack-free protective films.

TABLE II

| Ex. | Adduct | | | | | Reactive Diluent or Polyester Prepolymer | | | |
|---|---|---|---|---|---|---|---|---|---|
| | HEMA | HPMA | AA | MeOH | R-16 | nBA | iBMA | DEF | P-444A |
| 24 | — | 11.0 | — | — | 4.0 | 16.0 | — | — | 10.0 |
| 25 | 10.0 | — | — | — | — | 16.0 | — | — | 20.0 |
| 26 | 10.0 | — | — | — | — | 16.0 | — | — | 24.0 |
| 27 | — | 11.0 | — | — | — | 16.0 | — | — | 20.0 |
| 28 | 10.0 | — | — | — | — | 16.0 | — | — | 20.0 |
| 29 | — | 11.0 | — | — | — | 16.0 | — | — | 20.0 |
| 30 | 10.0 | — | — | — | — | 16.0 | — | — | 14.0 |
| 31 | — | 11.0 | — | — | — | 24.0 | — | — | — |
| 32 | 8.0 | — | — | 0.8 | — | 24.0 | — | — | — |
| 33 | 6.0 | — | — | 0.8 | — | 24.0 | — | — | — |
| 34 | — | — | 4.4 | — | — | 16.0 | — | — | 24.0 |
| 35 | — | — | 2.2 | — | 5.0 | 26.0 | — | — | — |
| 36 | 10.0 | — | 2.2 | — | — | 20.0 | — | — | — |
| 37 | — | 5.5 | 2.2 | — | — | 20.0 | — | — | — |
| 38 | 3.5 | — | 2.4 | — | 10.0 | 20.0 | 14.0 | 14.0 | — |
| 39 | 3.5 | — | 2.4 | — | 10.0 | — | 16.0 | 14.0 | — |
| 40 | 4.0 | — | 2.7 | — | 10.0 | 20.0 | — | — | — |

TABLE II-continued

| Ex. | Adduct | | | | | Reactive Diluent or Polyester Prepolymer | | | |
| --- | --- | --- | --- | --- | --- | --- | --- | --- | --- |
| | HEMA | HPMA | AA | MeOH | R-16 | nBA | iBMA | DEF | P-444A |
| 41 | — | — | 4.4 | — | — | — | — | 20.0 | 20.0 |
| 42 | 6.0 | — | 1.8 | — | — | 16.0 | — | 6.0 | — |

EXAMPLE 43

When eicosanol is substituted for the cetyl alcohol in the emulsification steps of the above examples, increased stabilizing effects are obtained in most instances.

EXAMPLE 44

When n-decane or n-hexadecane are added to the organic adduct-containing medium to be emulsified in the above examples instead of the cetyl alcohol or eicosanol in the aqueous emulsification medium, further improvements are obtained. These alkanes have lower melting points than their corresponding alkanols, enabling the use of lower temperatures or even room temperature in the emulsification. The alkanes are also operative in lower proportions relative to the emulsifying agent, e.g. from about 0.3–1:1. Improved emulsification results are also frequently obtained.

EXAMPLE 45

Similar results are obtained when the anionic sodium lauryl sulfate in the above examples is replaced by an equivalent amount of the cationic hexadecyltrimethylammonium bromide or octadecyl pyridine bromide, or by sodium hexadecyl sulfate.

This invention has been disclosed with respect to certain preferred embodiments, and various modifications and variations thereof obvious to persons skilled in the art are to be included within the spirit and scope of this invention and the scope of the appended claims.

We claim:

1. A method comprising
   I. reacting isocyanate groups in an organic polyisocyanate by anhydrous reaction with a chemically equivalent amount of primary hydroxyl-containing material, at least about 50 mole % of which material is one or a mixture of
      A. allyl alcohol, or
      B. at least one $C_{2-4}$ hydroxyalkyl ester of acrylic or methacrylic acid, to form a water-resistant adduct of said polyisocyanate with said material, and
   II. intimately dispersing said adduct, in the form of a water insoluble liquid phase, into an aqueous liquid medium containing
      a. an anionic or cationic oil-in-water functioning emulsifying agent, in the presence of
      b. an aliphatic hydrocarbon or hydrocarbyl alcohol which is inert, non-volatile, water insoluble, liquid, and contains a terminal aliphatic hydrocarbyl group of at least about 8 carbon atoms.

2. A method as defined in claim 1 wherein said organic polyisocyanate is a prepolymer containing plural units derived from 1,6-hexamethylene diisocyanate.

3. A method as defined in claim 2 wherein said step (I) reaction is carried out in the presence of a catalytic amount of dibutyl tin dilaurate.

4. A method as defined in claim 3 wherein said hydroxyl-containing material includes a $C_{1-6}$ primary monohydric alkanol.

5. A method as defined in claim 4 wherein said hydroxyl-containing material includes component (B).

6. A method as defined in claim 5 wherein said step (I) reaction is carried out in the presence of an ethylenically unsaturated monomeric polymerizable liquid diluent.

7. A method as defined in claim 6 wherein said aqueous liquid medium contains as anionic emulsifying agent is component (a).

8. A method as defined in claim 7 wherein said aqueous liquid medium also contains a hydrocarbyl alcohol as component (b).

9. A method as defined in claim 7 wherein component (b) is an aliphatic hydrocarbon included in said water-insoluble liquid phase.

10. A method as defined in claim 7 followed by
   III. the step of subjecting the crude emulsion from step (II) to the action of comminuting forces sufficient to reduce the average particle size of the dispersed water insoluble polyurethane-containing liquid phase to less than about 0.5 $\mu$.

11. A method as defined in claim 10 followed by
   IV. the step of gradually adding the stable emulsion from step (II) to an aqueous medium containing an effective polymerizing amount of a free radical initiator, and polymerizing to yield an aqueous emulsion of substantially fully polymerized polyurethane.

12. A method as defined in claim 11 followed by
   V. the step of coating a substrate with a film of the emulsion from step (IV) and permitting the film to air dry and harden in situ.

13. A method as defined in claim 3 wherein said hydroxyl-containing material includes component (A).

14. A method as defined in claim 13 wherein an ethylenically unsaturated monomeric polymerizable liquid diluent is admixed with said adduct from step (I) prior to step (II).

15. A method as defining in claim 14 wherein an unsaturated polyester prepolymer is admixed with said adduct from step (I) prior to step (II).

16. A method as defined in claim 14 wherein said aqueous liquid medium contains an anionic emulsifying agent as component (a).

17. A method as defined in claim 16 wherein said aqueous liquid medium also contains a hydrocarbyl alcohol as component (b).

18. A method as defined in claim 16 wherein component (b) is an aliphatic hydrocarbon included in said water-insoluble liquid phase.

19. A method as defined in claim 16 followed by
   III. the step of subjecting the crude emulsion from step (II) to the action of comminuting forces sufficient to reduce the average particle size of the dispersed water-in-soluble polyurethane-containing liquid phase to less than about 0.5 $\mu$.

20. A method as defined in claim 19 followed by
   IV. the step of admixing a catalytic amount of cobalt naphthenate, and 0 to about 2%, based on the weight of the water insoluble dispersed phase, of methyl ethyl ketone peroxide into the emulsion from step III.

21. A method as defined in claim 20 followed by
V. the step of coating a substrate with a film of the emulsion from step (IV) and permitting the film to cure, air dry and harden in situ.
22. An emulsion produced by the method of claim 1.
23. An emulsion produced by the method of claim 10.
24. An emulsion produced by the method of claim 11.
25. An emulsion produced by the method of claim 19.
26. An emulsion produced by the method of claim 20.
27. A coated substrate produced by the method of claim 12.
28. A coated substrate produced by the method of claim 21.
29. A method as defined in claim 12 carried out in the substantial absence of an inert volatile organic solvent.
30. A method as defined in claim 21 carried out in the substantial absence of an inert volatile organic solvent.

* * * * *